United States Patent Office 3,692,649
Patented Sept. 19, 1972

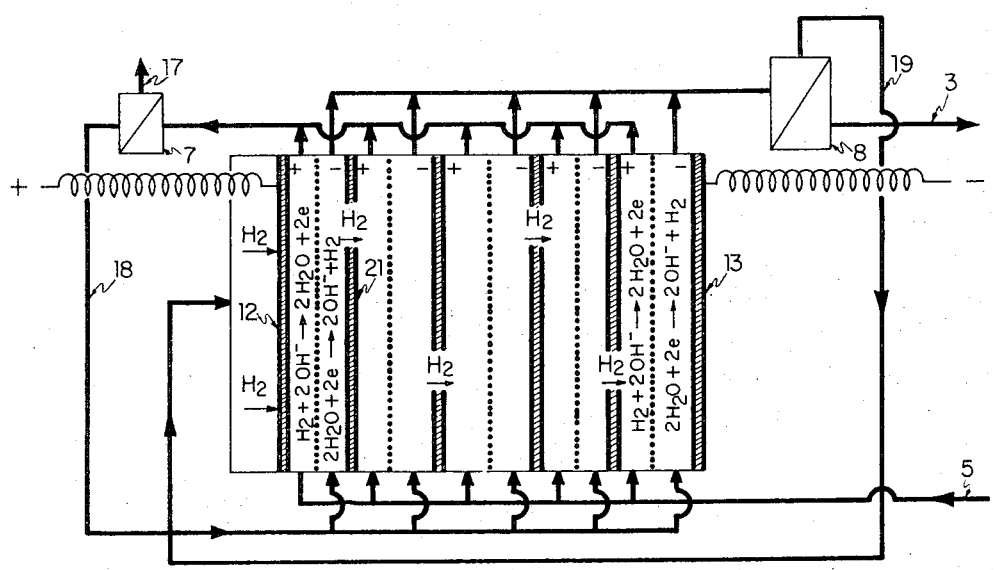
Fig. 2 bis.

3,692,649
PROCESS FOR REMOVING CARBON DIOXIDE FROM GASES
Michel Prigent, 49 Rue du Lieutenant Colonel de Montbrison, 92 Rueil-Malmaison, France, and Claude Dezael, 50 Avenue Egle, Residence Egle, 78 Maisons-Lafitte, France
Filed Nov. 7, 1969, Ser. No. 874,921
Int. Cl. C01b 13/04; C01d 7/34; H01m 27/28
U.S. Cl. 204—129                                         9 Claims

ABSTRACT OF THE DISCLOSURE

A process for producing oxygen and extracting carbon dioxide from a gas or gaseous mixture by extraction with a basic solution, evolving the carbon dioxide and oxygen in the anode compartment of an electrolytic cell, and passing the depleted base to the cathode compartment of the cell for regeneration.

---

This invention relates to an improved process for extracting carbon dioxide ($CO_2$) from a gas or a gaseous mixture containing the same. This process consists of extracting $CO_2$ from a gaseous mixture containing the same by means of a solution of a base, preferably an inorganic base, this extraction being carried out for example in a gas-liquid extraction column. According to the process of this invention, the solution containing the carbonated base, issued from the extraction zone, is regenerated in an electrochemical cell comprising two electrodes separated with a membrane: the solution to be regenerated is firse passed to an anodic compartment where evolution of $CO_2$ takes place with pH decrease and then, after separation of the so-evolved $CO_2$, it is passed to the cathodic compartment where the base is regenerated; the so-regenerated solution of the base may then be conveyed to the extraction column. As bases there are used those having a basicity constant in water at 20° C. higher than $10^{-6}$ and preferably higher than $10^{-4}$.

Besides the base, the extraction solution must contain a salt of an acid stronger than carbonic acid. This inert salt (it does not participate to the $CO_2$ extraction) is not decomposed when contacted with the electrodes, but provides for the passage of the current between said electrodes. In the following disclosure this salt will be named MX, whereas the base will be named MOH, M being a metal, preferably an alkali metal and X an anion of an acid stronger than carbonic acid.

The mineral bases which can be used are preferably the hydroxides of alkali metals such as sodium or potassium hydroxide in aqueous solution, although there can be used of course, other solvents such as for instance methanol or other alcohols, acetone, acetonitrile or dimethylsulfoxide as well as other bases soluble in water or in the solvent used when different from water.

As non-reactive or inert salts there can be used, by way of example: $NaClO_4$, $KCH_3CO_2$, $NaCH_3CO_2$, $NaCl$, $KCl$, $Na_2SO_4$, $K_2SO_4$. These salts are formed preferably between an alkaline metal and an acid stronger than carbonic acid, i.e., an acid having preferably a dissociation constant higher than $10^{-6}$ at 20° C.

The concentrations of base and of salt will be usually between 0.05 mole/liter and the saturation concentration, preferably between 0.1 and 10 moles per liter, the salt concentration having to be selected preferably in the vicinity of that resulting in the maximum of conductivity of the solution.

The two electrodes may be connected to a DC generator and constitute respectively the anode and the cathode of the same electrochemical cell. They can also be fed respectively with fuel and combustion-sustaining agent and constitute respectively the anode and the cathode of a fuel-cell connected to any current receiver.

Irrespective of the type of association of these two electrodes, the mixture of the respective solutions in the anodic and cathodic compartments must be completely or partially avoided by placing there between a membrane which must preferably oppose a high resistance to the interdiffusion of the electrolytes while exhibiting as low an electric resistance as possible. It is preferred to use as separator a selective cathionic membrane which prevents the passage of ions $OH^-$ as formed, from the cathode to the anode.

It is not necessary that the cathionic selectivity of the membrane be very high and the process can even be worked out with the use of membranes which do not exhibit a special ionic selectivity. The selective anionic ion-exchanging membranes are however not convenient. The electrodes to be used must be such that the electrochemical reactions produced therewith will result in an enrichment in $OH^-$ ions at the cathode and an impoverishment in said ions at the anode.

The electrochemical reaction taking place on the anode may consist either of oxidation of water as illustrated by the following scheme:

(a) 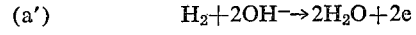

or of oxidation of a hydrogen-containing compound accompanied with the consumption of $OH^-$ ions: hydrocarbons, alcohols, hydrazine, hydrogen, for example. In the case of the electrochemical oxidation of hydrogen the reaction scheme is as follows:

(a′) 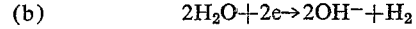

The electrochemical reaction taking place on the cathode may consist either of a reduction of water as shown by the following reaction scheme:

(b)             $2H_2O + 2e \rightarrow 2OH^- + H_2$ or of a reduction of an oxygenated combustion sustaining agent accompanied with the production of $OH^-$ ions: oxygen, hydrogen peroxide, for example. In the case of the electrochemical reaction of oxygen the reaction scheme is as follows:

(b′) 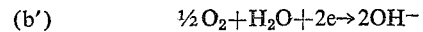

The space velocity of the solution in the anodic compartment must be so adjusted that the amount of $OH^-$ ions consumed in the reaction less the amount of the same ions issued from the cathodic compartment, by diffusion or migration through the separator (when the cationic selectivity thereof is not complete), be sufficient for decreasing the pH of said solution to such a value that carbon dioxide can evolve.

The voltage to be applied between the two electrodes depends on the kind of these electrodes and on the electrical resistivity of the medium which in turn depends on different factors such as: concentration of the salts present, type of the membrane used, temperature of the solution.

The voltage used for the electrolysis of water according to the process of the invention is in most cases between 2 and 5 volts.

After passage in the anodic compartment wherein takes place the decomposition of the carbonate previously formed when $CO_2$ was absorbed by the mineral base, the outflowing solution contains the non-reactive salt, the evolved $CO_2$ and oxygen in case of an anodic oxidation reaction of water. These two gases can be removed from the solution by any known decantation process.

After separation of oxygen, if any, and of $CO_2$, the solution which contains no more than the non-reactive salt, is injected in the cathodic compartment wherein takes place the regeneration of the inorganic base together with the formation of hydrogen (in the case of the cathodic reaction of reduction of water). The solution issuing from the cathodic compartment thus contains the non-reactive salt, the regenerated base (and in some cases hydrogen which can be withdrawn from the solution by any known decantation process). The solution which thus contains no more than the regenerated inorganic base and the non-reactive salt, may be introduced into a column for $CO_2$ extraction.

FIGS. 1, 2, 2 bis and 3 illustrate in a non-limitative manner, various embodiments of the invention.

Figure 2:
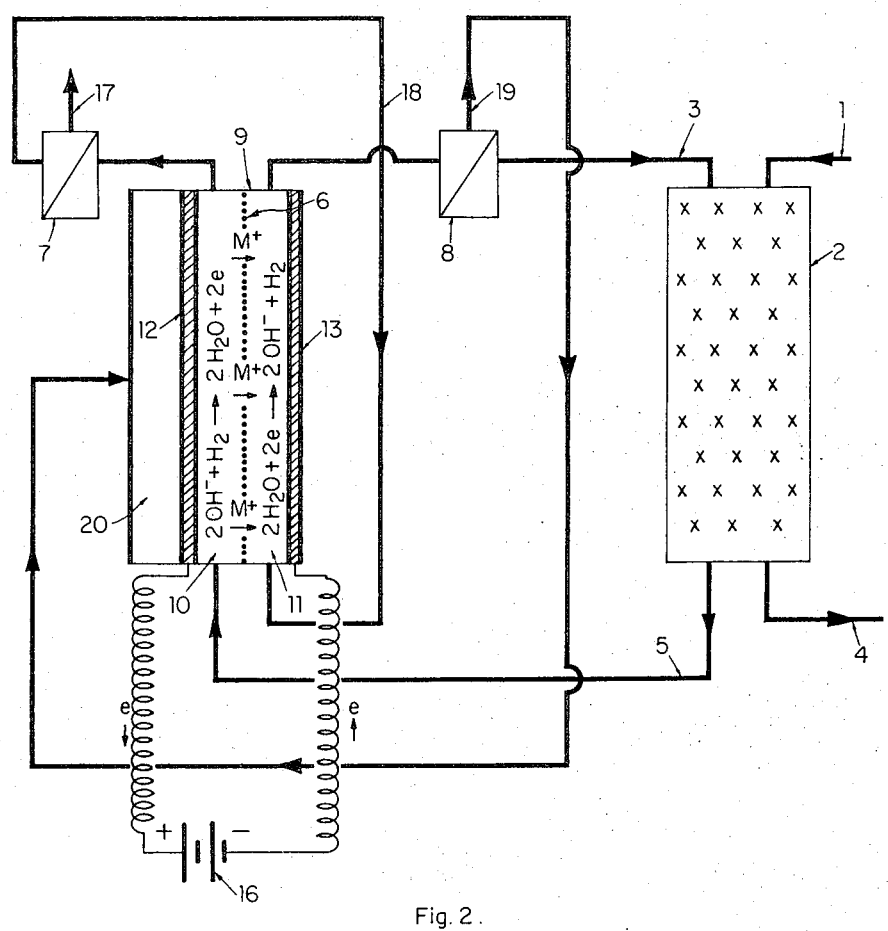
FIG. 2 illustrates an intermediate case where both electrodes are still fed with a D.C. generator but with hydrogen combustion simultaneously effected through a porous anode, said hydrogen advantageously originating from the cathode compartment.

FIG. 2 bis illustrates the association of a plurality of cells working according to the same principle as the cell of FIG. 2.

Figure 3:
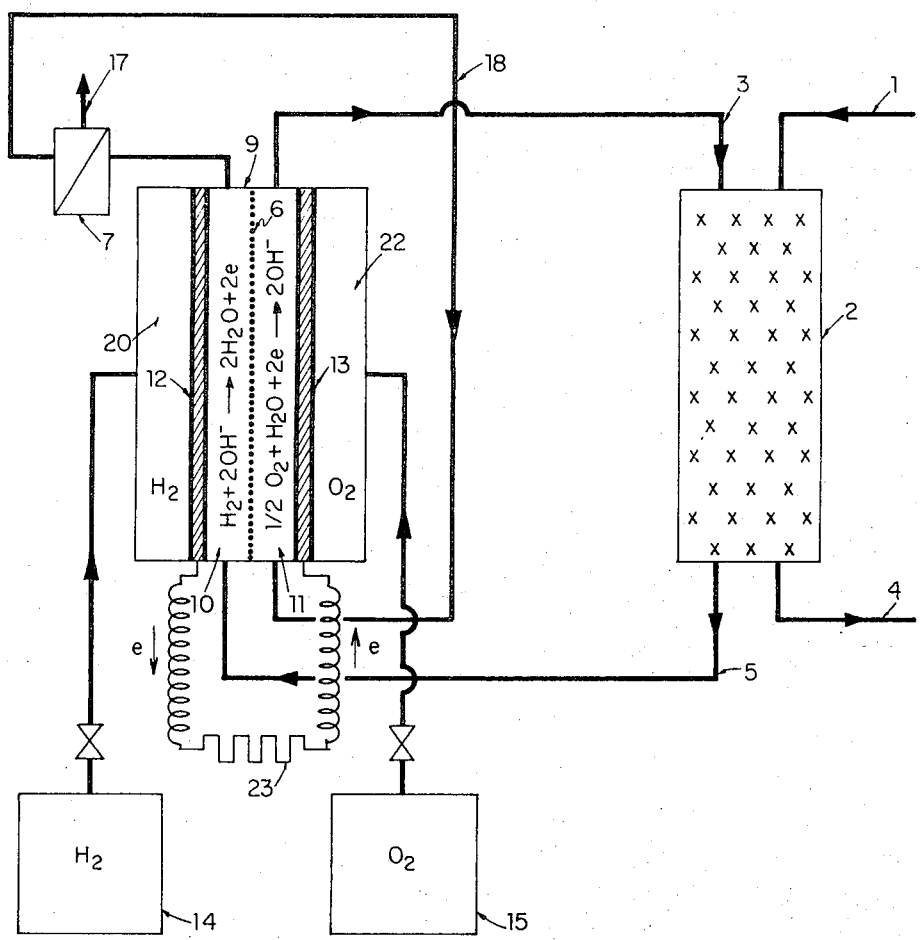

FIG. 3 illustrates the working as fuel cell.

Figure 1:
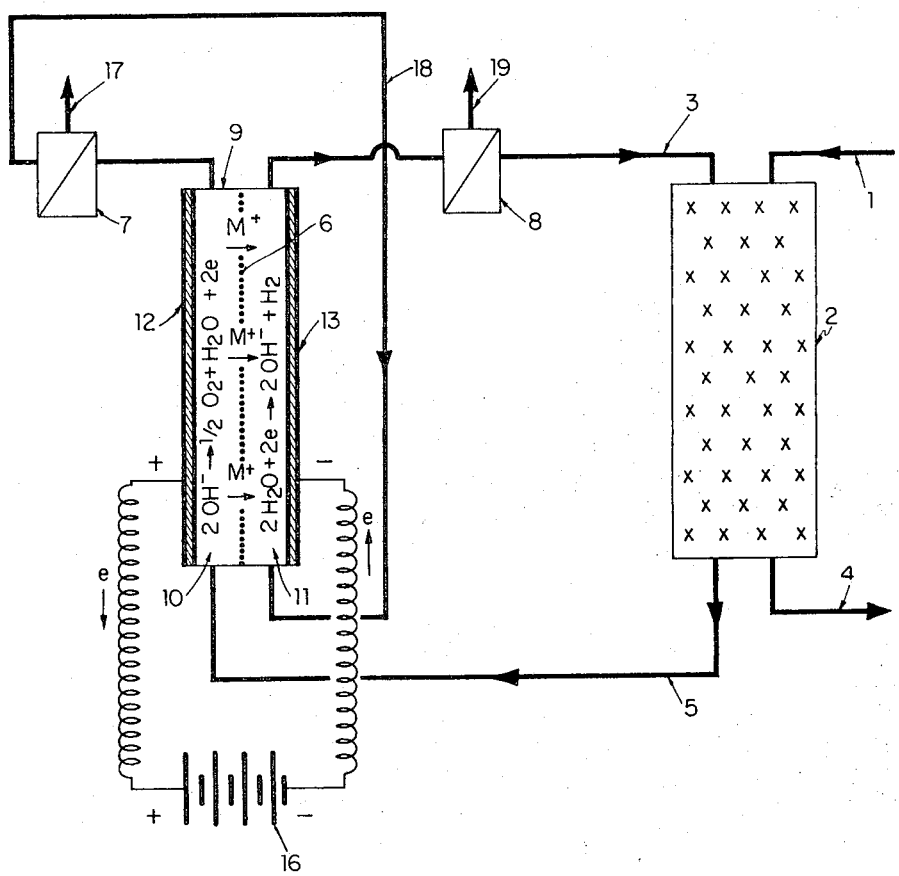
FIG. 1 illustrates the case where both electrodes are fed with a D.C. generator.

FIG. 1 shows the scheme of an embodiment with the use of an electrochemical cell wherein take place the reactions of oxidation and reduction of water. The manner of separating the different gases from the solution has not been defined, it being understood that the process of the present invention must not be limited to the use of any particular type of separation.

The embodiment shown in FIG. 1 comprises a column 2 for absorption of $CO_2$ and an electrolytic cell 9 provided with a separator consisting of a cationic membrane 6 and fed with generator 16.

Column 2 is fed on the one hand with a $CO_2$ containing gas through duct 1 and on the other hand with an aqueous solution of a base MOH also containing a salt MX as hereabove defined, through duct 3. The purified gas evolves through duct 4. The carbonated aqueous solution issuing from the zone where $CO_2$ is absorbed by the base MOH, passes through duct 5 to the anodic compartment 10 where oxygen is liberated on anode 12 while the pH decreases. By conveniently adjusting the intensity of electrolysis and the flow rate of the carbonated solution, the pH of the solution at the outlet from compartment 10 has such a value that at least one part of the carbonate is decomposed with liberation of $CO_2$. This $CO_2$ and the oxygen are separated in 7 and discharged through line 17 whereas the solution impoverished in (or free from) carbonate, but still containing the non-reactive salt MX is reintroduced through duct 18 into the cathodic compartment 11 of the cell 9. The reaction of hydrogen liberation occurring at the cathode 13 results in the formation of $OH^-$ ions and in the passage of cations $M^+$ from the anodic compartment to the cathodic compartment. The solution is thus enriched in base and, after separation of hydrogen in 8, is conveyed to the absorption column 2. The hydrogen is discharged through duct 19. In this embodiment there is used an electrolyse voltage which, depending on the type of the electrodes, the electric resistance of the membrane and of the solution, is about 3–4 volts. When the used membrane has a good cationic selectivity the energy supply will be of about 200 watts per mole of $CO_2$ removed.

According to a preferred embodiment of the process of this invention, such as shown in FIG. 2, it is possible to avoid the production of oxygen and hydrogen, which are often troublesome, with a lower electricity consumption for the same efficiency. This preferred embodiment consists in the use of an electrochemical cell 9 whose anode 12 is a gas-electrode of the type of those used for oxidizing hydrogen in fuel cells.

In such an arrangement the hydrogen formed at the cathode is conveyed, after separation at 8 to the compartment 20 on the rear side of anode 12 through which it diffuses and becomes oxidized in contact with the electrolyte with a consumption of $OH^-$ ions. The gas from duct 17 thus contains substantially no oxygen and consists substantially in its entirely of $CO_2$.

With such a process there can be used an arrangement comprising at least two electrochemical cells such as shown in FIG. 2, connected to one another. In an arrangement of this type, such as shown in FIG. 2 bis, the cells are electrically connected in series, the circulation of the extracting solution being in parallel. The hydrogen transfer from cathode to anode is achieved by the mere use of a common porous electrode such as 21 with two vicinal compartments, said electrode having one face acting as an anode, the other face acting as a cathode; the hydrogen recycling being no longer necessary except between the two farthest electrodes.

With this arrangement, the electrolysis voltage is only 1 volt, the electrical energy consumption being about 50 watts per mole of $CO_2$ removed.

Another embbodiment of the process by which the production of oxygen and hydrogen can be avoided while using a lower amount of electricity for the same efficiency, consists, with similarity to the preceding embodiment, in recycling the oxygen evolved at the anode onto the porous cathode where it is reduced.

As in the preceding example the use of bielectrodes in the assembly comprising more than two cells electrically connected in series avoids the recycling of oxygen except between the electrodes located at the two ends of the cells assembly.

The process of the present invention can be carried out with the use of a number of other arrangements well known in the art and it is therefore not limited to the particular exemplified embodiments of FIGS. 1, 2 and 2 bis.

As stated above there can in fact be used any electrochemical apparatus which results in an anodic reaction providing the consumption of $OH^-$ ions, necessary to the desorption of $CO_2$ and in a cathodic reaction producing $OH^-$ ions, necessary to the regeneration of the inorganic base.

Another example of an embodiment of the process of this invention is that of a fuel cell whose anode and cathode selectivity, provide respectively for the desorption of $CO_2$ and the regeneration of the inorganic base. There may be used any type of fuel cell producing $OH^-$ ions at its cathode and consuming the same ions at its anode. One example of such an embodiment is shown in FIG. 3, where the fuel cell is of the hydrogen-oxygen type. The separator 8 may be omitted since no substantial formation of hydrogen occurs. There is used a porous anode 12 fed with hydrogen from container 14 and a porous cathode 13 whose face closer to compartment 22 is fed with oxygen from container 15. The gas of pipe 17 is essentially $CO_2$.

The fuel cell may supply its current to an external electric resistor 23 or to any other type of electric receiver; the electrical energy produced can be used for operating the various pumps required for circulating the fluids. The fuel cell may also be short-circuited so as to obtain the maximum electric current.

The process for separating $CO_2$ in accordance with this invention is applicable in many cases. By way of example it can be used for purifying the hydrogen supplied to fuel cells, for separating $CO_2$ from air in a process of regenerating air used for example in submarine crafts or dwelled satellites, or for the feeding of fuel cells with alkaline electrolyte.

What we claim is:

1. A continuous process for producing oxygen, and separating carbon dioxide from a gas containing the same, comprising the steps of (a) contacting said gas with an aqueous solution of an inorganic base and a non-reactive salt of an acid stronger than carbonic acid, in an extraction zone, so as to extract carbon dioxide thereof, (b)

feeding the anode compartment of an electrochemical cell with the solution recovered from step (a), said solution containing a carbonate of the base and the non-reactive salt, said electrochemical cell comprising two compartments separated by a membrane, one for the anode and the other for the cathode, (c) passing an electric current through the cell from an external DC generator having its positive terminal connected to said anode and its negative terminal connected to said cathode, and adjusting the space velocity of the solution in the anode compartment so that the amount of $OH^-$ ions consumed in the reaction less the amount of $OH^-$ ions issuing from the cathode compartment by diffusion through the separator, is sufficient for decreasing the pH of said solution to such a value to permit the evolution of carbon dioxide; said pH and said passage of current being sufficient to result in the evolution of carbon dioxide and oxygen in the anode compartment, (d) withdrawing resultant solution from the anode compartment, (e) separating the evolved carbon dioxide and oxygen from the solution withdrawn from the anode compartment, (f) feeding resultant oxygen and carbon dioxide depleted solution to the cathode compartment, and (g) feeding the extraction zone with the solution withdrawn from the cathode compartment, whereby said process results in an improvement of the invironment.

2. A process according to claim 1, wherein hydrogen liberated at the cathode if any, is separated from the solution before the same is returned to the $CO_2$ extraction zone.

3. A process according to claim 1, wherein the membrane is non-selective.

4. A process according to claim 1, wherein the membrane is cation selective.

5. A process according to claim 2, wherein the hydrogen is directed, after separation, onto the anode, where it is reoxidized.

6. A process according to claim 5, wherein at least two cells are employed the different electrodes being connected in series, said electrodes being porous and of the type of fuel cell electrodes, the cathode of one cell acting as an anode for the next cell, the hydrogen eveloved at one of said cathodes being transferred to the next anode owing to the porous structure of these electrodes.

7. A process according to claim 1, wherein oxygen is conveyed, after separation, onto the cathode, where it is reduced.

8. A process according to claim 1 wherein the cathode and the anode form the electrodes of a fuel cell.

9. A process according to calim 1, wherein the solution is an aqueous solution of an alkali metal hydroxide and a salt formed between an alkali metal and an acid stronger than carbonic acid.

References Cited
UNITED STATES PATENTS

| | | | |
|---|---|---|---|
| 3,196,092 | 7/1965 | Beer | 204—130 |
| 3,511,712 | 5/1970 | Giner | 204—130 |
| 2,726,930 | 12/1955 | Edwards et al. | 204—130 |

JOHN H. MACK, Primary Examiner

R. L. ANDREWS, Assistant Examiner

U.S. Cl. X.R.

204—101, 130; 136—86